(12) United States Patent
Silz (10) Patent No.: US 8,702,119 B2
(45) Date of Patent: Apr. 22, 2014

(54) TRAILER HAVING A VARIABLE WIDTH

(76) Inventor: Martin Silz, Fort Morgan, CO (US)

( * ) Notice: Subject to any disclaimer, the term of this patent is extended or adjusted under 35 U.S.C. 154(b) by 79 days.

(21) Appl. No.: 13/410,148

(22) Filed: Mar. 1, 2012

(65) Prior Publication Data
US 2012/0223510 A1    Sep. 6, 2012

Related U.S. Application Data (60) Provisional application No. 61/448,457, filed on Mar. 2, 2011.

(51) Int. Cl.
*B60P 3/42* (2006.01)
(52) U.S. Cl.
USPC .................................. 280/656; 296/26.15
(58) Field of Classification Search
USPC ........... 280/656, 639, 400, 401, 405.1, 415.1, 280/417.1; 296/26.01, 26.12, 26.15, 181.7
See application file for complete search history.

(56) References Cited

U.S. PATENT DOCUMENTS

| | | | |
|---|---|---|---|
| 4,101,158 A * | 7/1978 | Jones | 296/10 |
| 4,119,224 A * | 10/1978 | Moody | 414/537 |
| 4,981,318 A * | 1/1991 | Doane et al. | 296/182.1 |
| 5,401,050 A * | 3/1995 | Baker | 280/656 |
| 5,486,020 A * | 1/1996 | Kuhns | 280/789 |
| 5,924,754 A * | 7/1999 | Kuhns | 296/26.15 |
| 6,644,708 B1 * | 11/2003 | Grzegorzewski et al. | 296/32 |
| 7,591,497 B2 * | 9/2009 | Johns | 296/3 |
| 8,317,249 B2 * | 11/2012 | Slater et al. | 296/26.01 |
| 2010/0133874 A1 * | 6/2010 | Slater et al. | 296/182.1 |

* cited by examiner

*Primary Examiner* — John Walters
*Assistant Examiner* — Brian Swenson
(74) *Attorney, Agent, or Firm* — Klaas, Law, O'Meara & Malkin PC; Robert W. Nelson, Esq.

(57) ABSTRACT

A trailer is disclosed herein. In one embodiment, the trailer has an extension platform having a first side and a second side. The first side of the extension platform is pivotally connected to at least a portion of a side of the trailer. The extension platform is movable by way of the pivotal connection between a position that is substantially perpendicular to the trailer and a position that is substantially parallel to the trailer. A secondary platform is pivotally connected to the second side of the extension platform. The secondary platform is movable by way of the pivotal connection between a first position that is substantially perpendicular to the extension platform and a second position that is substantially parallel to the extension platform.

19 Claims, 7 Drawing Sheets

TRAILER HAVING A VARIABLE WIDTH

This application claims priority to U.S. provisional patent application 61/448,457 for TRAILER HAVING A VARIABLE WIDTH of Martin Silz, filed on Mar. 2, 2011, which is incorporated for everything that is disclosed.

BACKGROUND

Wide trailers are used to haul wide objects on roadways. The objects being hauled are typically wider than a conventional travel lane of a roadway, so trailer wider than conventional travel lanes must be used to haul the objects. With regard to the agricultural industry, combines and other machinery that are wider than conventional travel lanes are required to be transported to a variety of different fields. Due to the width of these machines, they are often transported on trailers that are wider than the conventional travel lanes.

The wide trailers are difficult to use on roadways because they occupy more than one travel lane. Accordingly, they need special care when they are on the roadways, even when they are empty. For example, special indicators or chase vehicle may be required to warn other motorists about the wide load. In addition, the wide trailers have to make special provisions when turning or using narrow roadways.

Conventional trailers that may be widened also have problems. Because they carry very heavy loads, the trailers need to be extremely robust and heavy. These trailers are difficult to widen or narrow. For example, they may have ribs that need to be extended from a central frame. The ribs are extremely heavy and are not readily extendable. This problem leads to excessive time required in order to widen or narrow the trailers. This leads to excessive time in transporting objects by way of the trailers.

DETAILED DESCRIPTION

Figure 1:
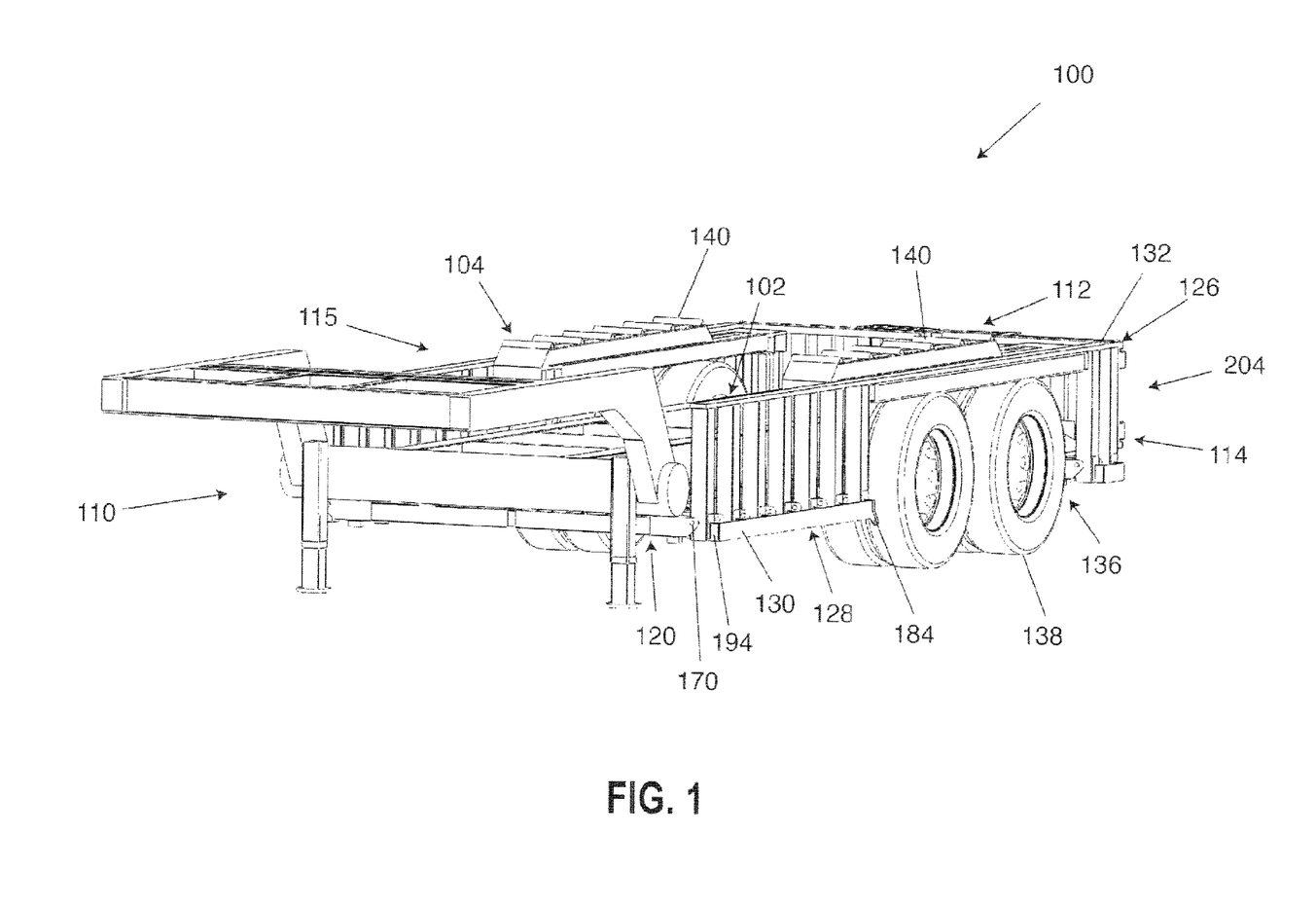
FIG. 1 is a front isometric view of an embodiment of a trailer that has extension platforms wherein the extension platforms are in a stored position.
Figure 2:
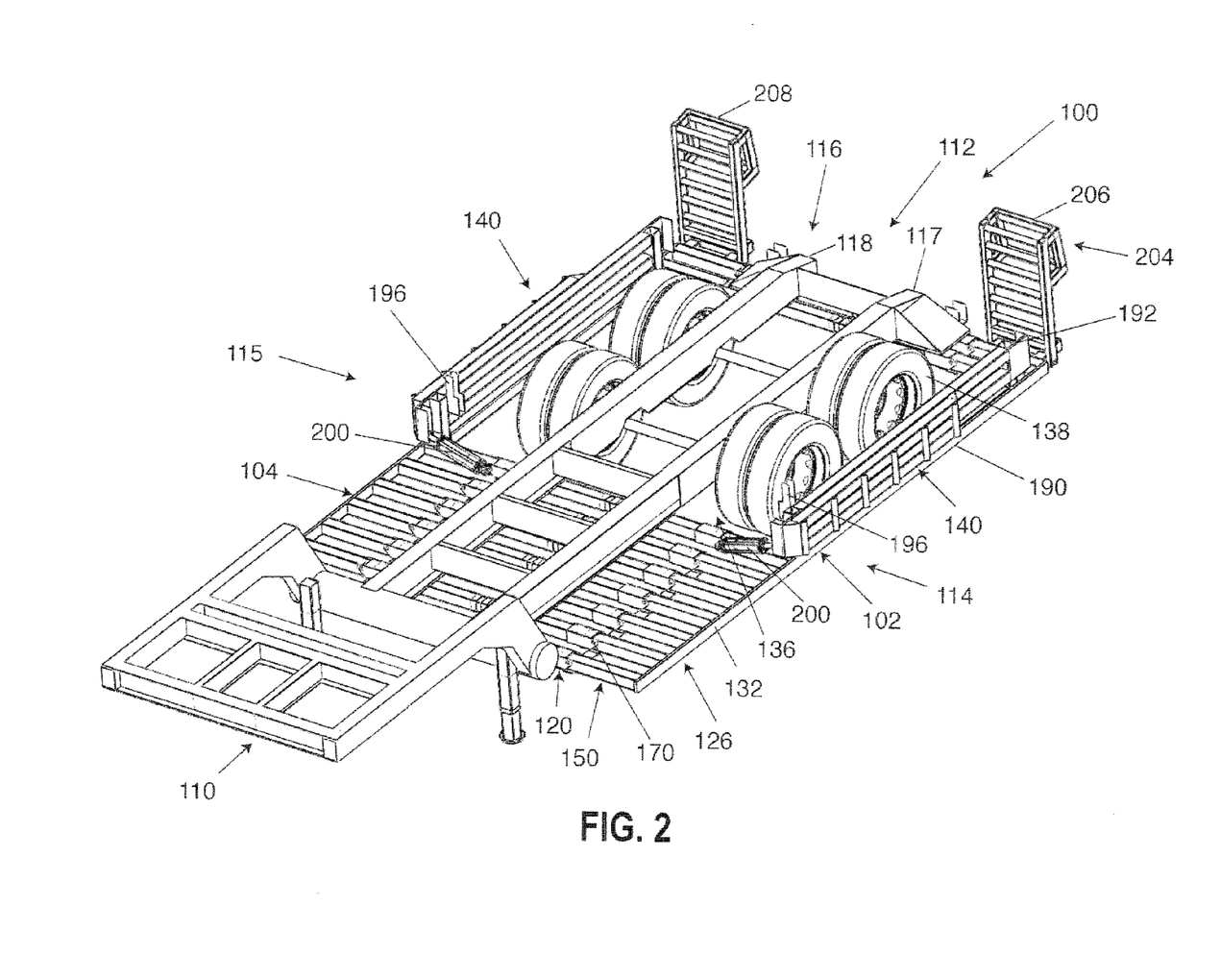
FIG. 2 is a front isometric view of the trailer of FIG. 1 with the extension platforms in an extended position.
Figure 3:
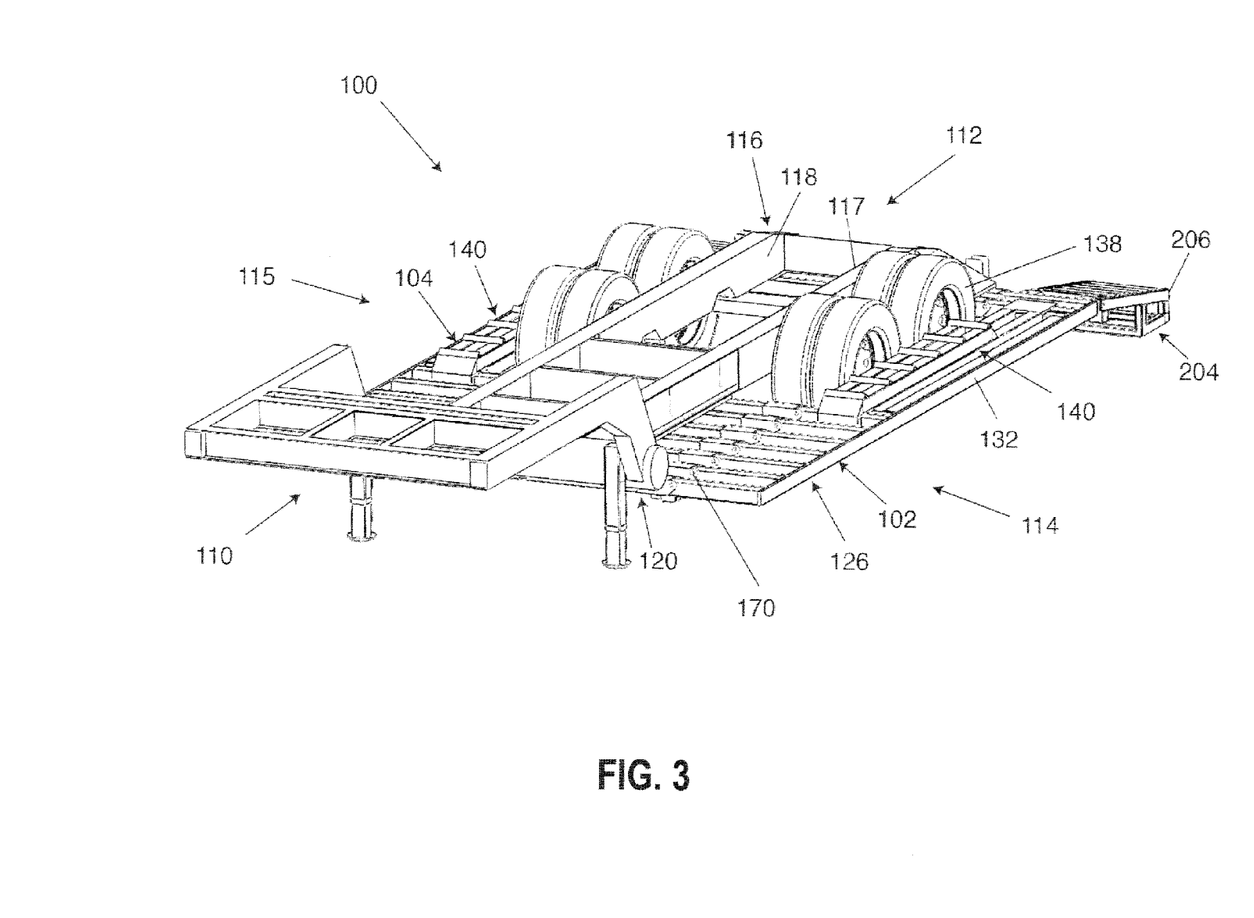
FIG. 3 is a front isometric view of the trailer of FIG. 1 with the extension platforms in a the extended position and secondary platforms ready to accept a load.

Reference is made to FIGS. 1-3, which show an embodiment of a trailer 100. In summary, FIG. 1 is a front isometric view of an embodiment of the trailer 100, wherein the trailer 100 has extension platforms 102, 104. The extension platforms 102, 104 as shown in FIG. 1 are in a stored or first position. The extension platforms are referred to individually as a first or left extension platform 102 and a second or right extension platform 104. FIG. 2 is a top isometric view of the trailer 100 of FIG. 1 with the extension platforms 102, 104 in a partially extended position. The extended position of the extension platforms 102, 104 is sometimes referred to as a second position. FIG. 3 is a front isometric view of the trailer 100 with the extension platforms 102, 104 in the extended or second position, which enables the trailer 100 to accept a wide load.

The trailer 100 is used to transport loads that are wider than loads normally transported on roadways. As described in greater detail below, the trailer 100 expands or widens to accommodate the wide loads. When the trailer 100 is not used for transporting wide loads, its width can be readily reduced in order to travel on ordinary roadways as shown in FIG. 1. The reduced width is achieved by positioning the extension platforms 102, 104 in the stored or first position as shown in FIG. 1. When the trailer 100 is used to transport wide loads, the extension platforms 102, 104 are positioned in the extended or second position as shown in FIG. 3.

One of the many uses of the trailer 100 is to transport combines and large sprayers that are used in farming. These devices are typically much wider than ordinary road lanes and need to be transported using a wide trailer. The trailer 100 widens in order to enable it to accept a combine or sprayer, which can then be transported to or from a farm. When not in use, the width of the trailer 100 can be easily reduced to allow for normal roadway transport and storage.

The trailer 100 has a front end 110 and a rear end 112. The front end 110 may be configured to connect to a truck or the like (not shown) that pulls the trailer 100. Objects being hauled by the trailer 100 may be loaded from the rear end 112. The trailer 100 also has a left side 114 and a right side 115.

A central structure may extend between locations proximate the front end 110 and the rear end 112. In the embodiments described herein, the central structure includes central beams 116 that extend between locations proximate the front end 110 and the rear end 112. The embodiment of the trailer 100 described herein has two central beams, which are referred to as the left central beam 117 (sometimes referred to as the first central beam) and the right central beam 118 (sometimes referred to as the second central beam). In some embodiments, the trailer 100 may have a single central beam or other structure. A plurality of beams 120 may be affixed to or extend from the central beams 116. In the embodiments of the trailer 100, the extension platforms 102, 104 are pivotally attached to the beams 120.

Each side 114, 115 of the trailer 100 has at least one extension platform 102, 104. The first extension platform 102 is movably attached to beams 120 associated with the left side 114 of the trailer 100. The second extension platform 104 is movably attached to beams 120 associated with the right side 104 of the trailer 100. The first extension platform 102 is substantially similar in construction and operation to the second extension platform 104. Therefore, the description of the first extension platform 102 described herein is applicable the second extension platform 104.

The following description references the first extension platform 102, which, as stated above, is substantially similar to the second extension platform 104. The first extension platform 102 is pivotally attached to the beams 120 that extend from the first central beam 116. As described above, the first extension platform 102 is movable between a first position where it is stored or vertical to a roadway and a second position where it is extended or horizontal to a roadway. The first extension platform 120 is shown in the stored position in FIG. 1.

Figure 4:
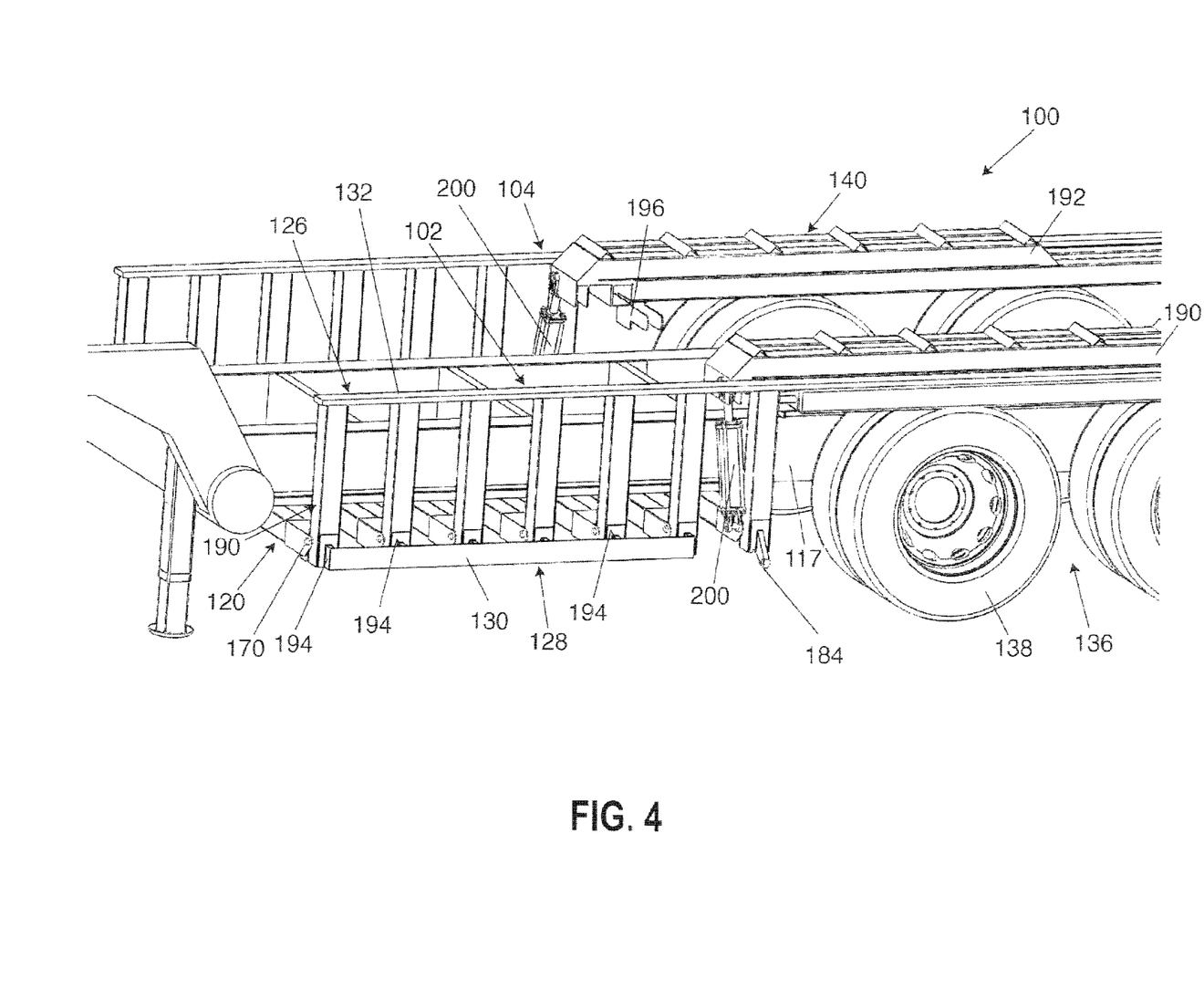
FIG. 4 is an enlarged, side view of an embodiment of a portion of the first extension platform.

Additional reference is made to FIG. 4, which is an enlarged view of the first extension platform 102. The first extension platform 102 has a second side 126 and a first side 128. The second side 126 has a rail 130 associated therewith that will be described in greater detail below. The rail 130 may not extend the length of the second side 126. The first side 128 has a rail 132 extending at least a portion of the length of the first side 128. The rail 132 defines the outer boundary of the trailer 100 when the first extension platform 102 is in the extended position. More specifically, the left side 114 of the trailer 100 is defined by the rail 132 when the extension platform 102 is in the extended position.

As shown in FIG. 1, a space 136 exists in the first extension platform 102 in order to accommodate the wheels 138 of the trailer 100. A similar space exists in the second extension platform 104 in order to accommodate the wheels 138 on the right side 115 of the trailer 100. In order to provide the maximum stability for the trailer 100, the wheels 138 may extend out as far from the central beams 116 as possible. In order for the first extension platform 102 to be movable, it must have the space 136 to accommodate the wheels 138.

Secondary platforms 140 are pivotally attached to the rails 132 or proximate the rails 132 on both extension platforms 102, 104. It is noted that the secondary platforms 140 may be attached to other devices on the extension platforms 102, 104. The secondary platforms 140 are in a first position when they are perpendicular to the extension platforms 102, 104 and they are in a second position when they are parallel to the extension platforms 102, 104. In the embodiments of FIGS. 1-4, the secondary platforms 140 are located proximate the spaces 136 for the wheels 138.

The following description applies to the secondary platform 140 attached to the rail 132 on the first extension platform 102. It is noted that the following description is applicable to the secondary platform 140 associated with the second extension platform 104. When the first extension platform 102 is in the stored position as shown in FIGS. 1 and 4, the secondary platform 140 is located in the first position. The secondary platform 140 may also be referred to as being or stored position as it may be locked to prevent the first extension platform 102 from moving. The stored position of the secondary platforms places them between the first side 114 and the second side 115 of the trailer so as not to widen the trailer 100. The secondary platforms 140 may be referred to as folding between the stored and unstored or first and second positions by way of their pivotal attachment to the extension platforms 102, 104.

When the first extension platform 102 is extended as shown in FIG. 3, the secondary platform 140 pivots or otherwise moves relative to the first extension platform 102 to at least partially fill the space 136. The position of the secondary platform 140 as shown in FIG. 3 and is referred to as an extended position. Because the secondary platform 140 is parallel to the extension platform 102, the secondary platform 140 is referred to as being in the second position. The extended position of the secondary platform 140 enables a user of the trailer 100 to drive machinery, such as a combine, onto the extension platforms 102, 104 and secondary platforms 140 without encountering the space 136. More specifically, the secondary platform 140 at least partially fills the space 136. Therefore, a combine or other wide vehicle can be loaded onto the trailer 100 so as to be located on the outside of the wheels 138. The vehicle may sit on or be located over the secondary platform 140, wherein the secondary platform 140 prevents the vehicle from falling through the space 136. The secondary platform 140 has a height that enables the vehicle to clear the wheels 138 when the vehicle encounters the secondary platform 140.

Having summarily described many of the elements of the trailer 100, the trailer 100 will now be described in greater detail.

Figure 5:
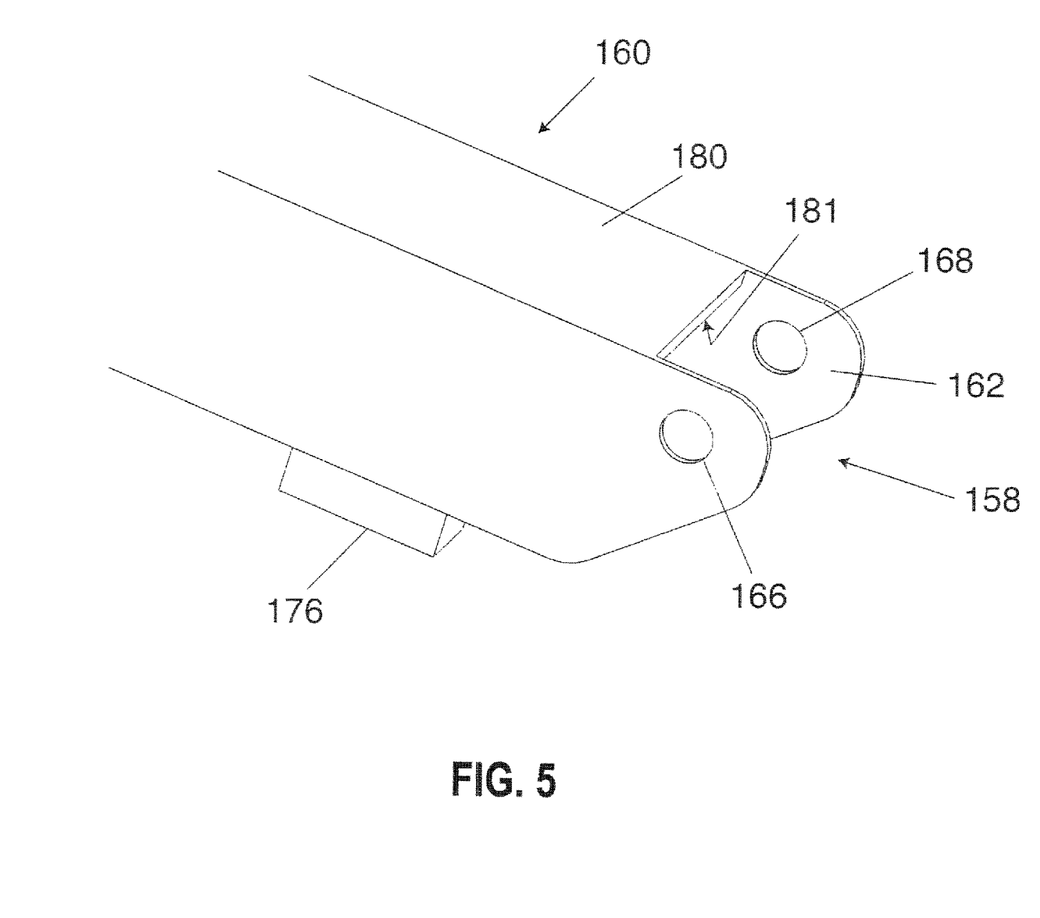
FIG. 5 is an isometric view of an embodiment of a beam that extends from the central beams of FIG. 3.

Additional reference is made to FIG. 4, which is an enlarged view of the left extension platform 102 in the stored position and FIG. 5, which is an enlarged view of a beam 160, which is one of the beams 120. As described above, the extension platforms 102, 104 are pivotally attach to the plurality of beams 120 that extend from the central beams 116. Although a plurality of beams 120 are described herein, a single device, rather than the plurality of beams 120, could be adapted to be pivotally attached to the extension platforms 102. 104. For example, the extension platforms 102, 104 could be attached to rails that at least partially extends between the front end 110 and the rear end 112 of the trailer 100.

With reference to the first extension platform 102, it has a plurality of supports 190 that extend between the rails 130, 132. In the embodiments described herein, the supports 190 may be beams that are pivotally attached to the beams 120 as described in greater detail below. In other embodiments, the rail 130 may be pivotally attached to the beams 120. The lengths of the supports 190 provide the amount of width in which the trailer 100 extends. For example, if the supports 190 are two feet long, the trailer 100 is extendable by four feet, which is two feet per side 114, 115. A plurality of blocks 194 are located between the first rail 126 and the supports 190. As described below, the blocks 194 serve to fix the first extension platform 102 in a specific location when it is in the extended position.

Additional reference is made to FIG. 5, which is an end view of a beam 160, wherein the beam 160 is typical of all the beams 120 extending from the central beams 116. The beam 160 has an end 158 which is located opposite the central beams 116. The end 158 has an opening 162 that is configured to receive one of the supports 190 as shown in FIG. 1-4. Each side of the opening 162 has a hole 166, 168 that is configured to have a pin 170, FIG. 4, pass therethrough. More specifically, the supports 190 have at least one hole (not shown) that is aligned with the holes 166, 168. By passing the pin 170 through all the holes, the supports 190, and thus, the first extension platform 102, is pivotally attached to the beams 120.

In some embodiments, there may be a plurality of pins 170 wherein each of the beams 120 and supports 190 have an individual pin 170 associated therewith. In other embodiments, each side 114, 115 may have pin that passes through a plurality of beams 120 and supports 190. For example, each side may have a single pin that passes through all the beams 120 and supports 190. In yet another embodiment, sleeves or the like that contain hinge devices may be placed over the ends 158 of the beams 120. One side of the hinge device connects to the beams 120 and the other side of the hinge device connects to the supports 190, so they pivot about the hinge device.

A block 176 may be attached to the under side of the beam 160. The block 176 is located in a position so as to contact the block 194, FIG. 4, when the first extension platform 102 is in the extended position. The contact between the blocks 194, 176 increases the support between the first extension platform 102 and the beams 120 and it reduces the likelihood that the first extension platform 102 will extend beyond a predetermined distance. For example, the contact between the blocks 194, 176 may prevent the first extension platform 102 from extending beyond an angle of one hundred eighty degrees relative to the beams 120. The contact between the blocks 194, 176 also provides a contact point for the force exerted between the beam 160 and the supports 150 when a load is applied to the extension platform 102. By concentrating the force between the blocks 194, 176, the blocks have the force applied to them and can be made strong enough so as not to be damaged when a heavy load is placed on the support platform 102. It is noted that the force is also applied to the pins 170 and their associated support structure.

The beam 160 has a top portion 180 that is attached to the sides. In such an embodiment, the interior of the beam 160 may be substantially hollow. When the extension platform 102 is in the extended position, a portion of the supports 190 contacts the underside 181 of the top portion 180. This contact will further prevent the first extension platform 102 from extending beyond a predetermined distance relative to the beams 120. It is noted that due to the rigid structure of the components of the trailer 100, the blocks 176, 194 may not contact each other at the same time that a support 190 contacts the underside 181 of the beam 160.

Referring again to FIG. 4, a member 184 may be attached to the first extension platform 102. The member 184 is attached to a hydraulic device (not shown), such as a hydraulic piston, that moves the first extension platform 102 between the extended and stored positions. The hydraulic device may be located under the beams 116 so that it does not interfere with machinery or the like that may be loaded onto the trailer 100.

Having described the support platforms 102, 104, the secondary platforms 140 will now be described. In summary, the secondary platforms 140 serve to fill the spaces 136 in the support platforms 102, 104 that are used for clearance of the tires 138. The secondary platforms 140 also serve to lift a combine or other vehicle or device being hauled by the trailer 100 over the wheels 138.

The secondary platforms 140 are shown in the stored position in FIG. 1. Reference is made to the secondary platform 140 that is associated with the first extension platform 102. The secondary platform 140 has a first side 190, FIG. 2, and a second side 192, wherein the first side 190 is pivotally connected to the first extension platform 102. For example, the secondary platform 140 may be pivotally attached to the rail 132. Accordingly, the secondary platform 140 is able to pivot relative to the first extension platform 102.

The second side 192 of the secondary platform 140 has a securing mechanism 196, such as a latch, associated therewith. The securing mechanism 196 serves to secure the secondary platform 140 in place by locking the secondary platform to the first central beams 116. Therefore, the secondary platform 140 does not bounce out of the stored position as the trailer 100 is being moved. The securing mechanism 196 may include a latch mechanism that connects the secondary platform 140 to the first central beam 117 and a handle that may be moved in order to release the secondary platform 140 from the first central beam 117.

A hydraulic device 200 may be attached between the secondary platform 140 and the extension platform 102 in order to facilitate movement of the secondary platform 140. As described in detail below, the hydraulic device 200 may be located out of the way of any device that may be hauled by the trailer 100.

Figure 6:
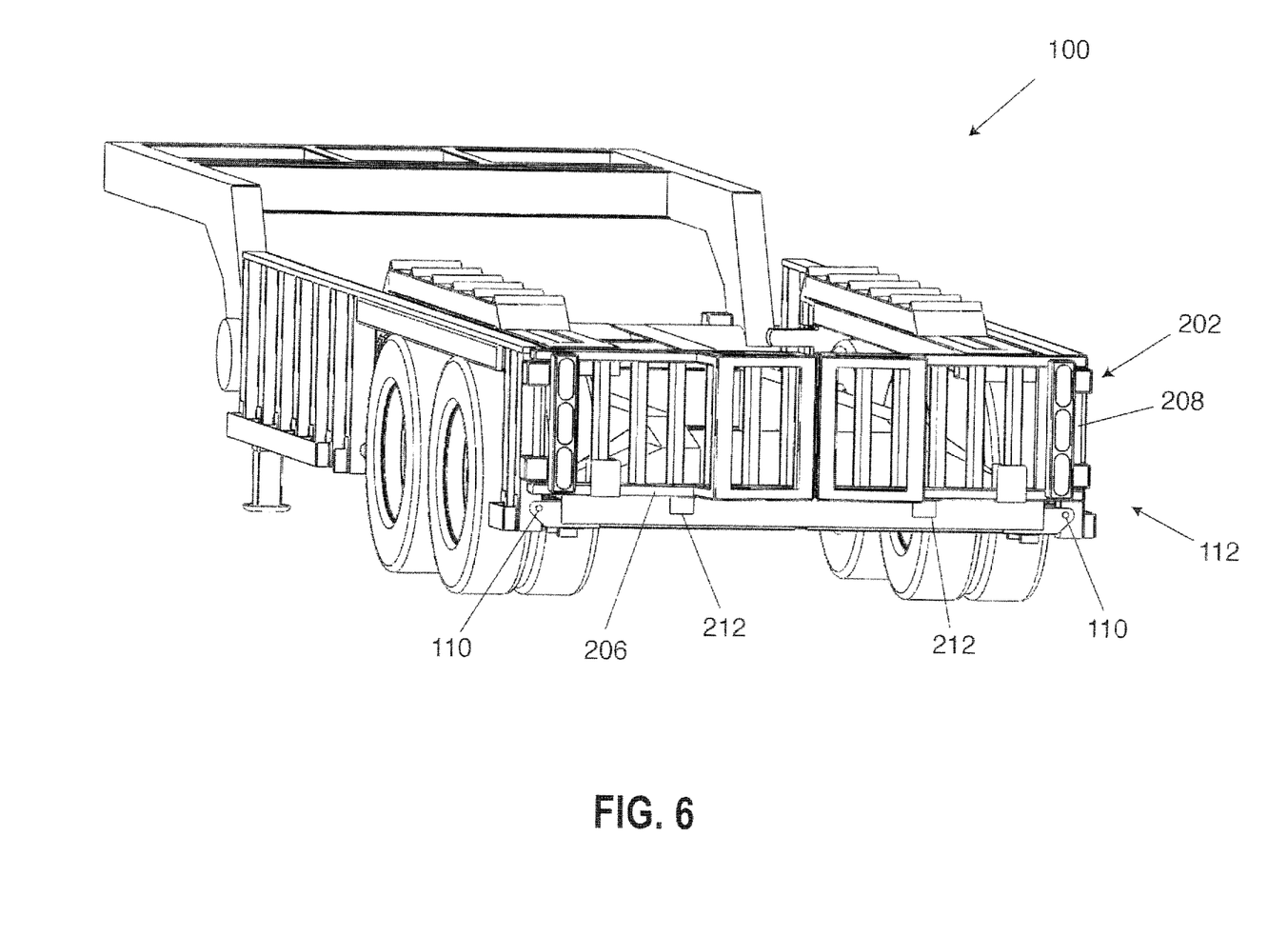
FIG. 6 is a rear view of the trailer of FIG. 1 with the ramps stored.
Figure 7:
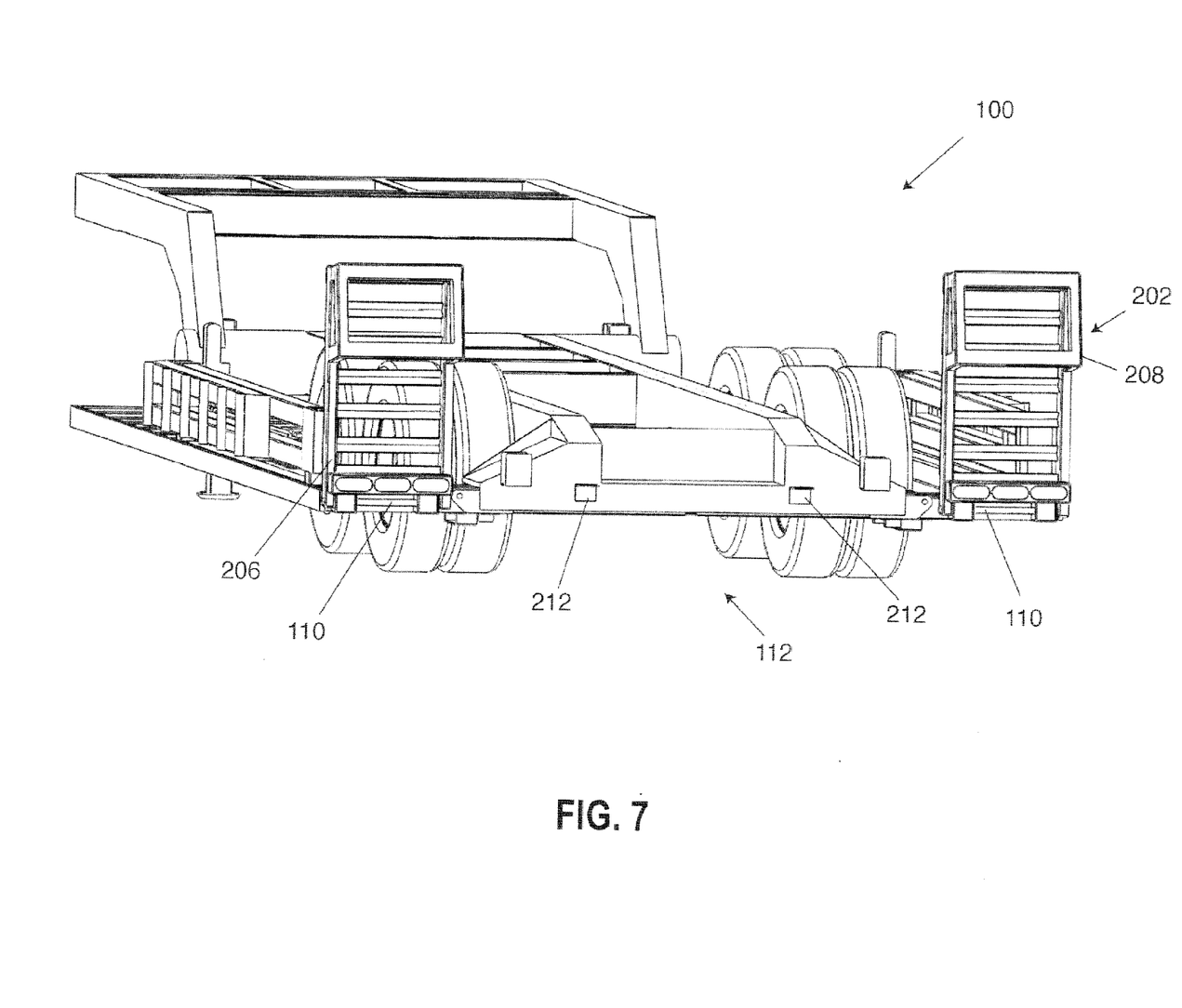
FIG. 7 is a rear view of the trailer of FIG. 2 with the ramps in a stored state and the extension platforms in an extended state.

Referring to FIGS. 6 and 7, which are rear views of the trailer 100, the trailer 100 may have ramps 204 connected to the extension platforms 102, 104. The ramps are referred to individually as a left ram 206 and a right ramp 208. The ramps 204 facilitate loading and unloading of items onto the trailer 100.

FIG. 6 shows the ramps 204 in a stored position with the extension platforms 102, 104 also in a stored position. In this position, the ramps 204 may be latched or otherwise secured together. In other embodiments, securing members 212 are located on the rear end 112 of the trailer 100, wherein the ramps 204 or protrusions on the ramps 204 enter the securing mechanisms. The securing mechanisms 212 prevent the ramps 204 from becoming loose. FIG. 7 shows the ramps in a stored position, but with the extension platforms 102, 104 in the extended position.

FIG. 7 shows the first ramp 206 that is pivotally connected to the first extension platform 102 by way of a pin or hinge 210. The ramp 206 is in a stored position meaning that the trailer 100 may be pulled with the ramp 206 in this position. FIG. 3 shows the ramp 206 in a loading position that is used to load a vehicle onto the trailer 100. As the first extension platform 102 is moved to the stored position as shown in FIG. 6, the first ramp 206 may be pivoted to as to engage a securing member 212. The securing member prevents the first ramp 206 from moving as the trailer 100 is being transported. It is noted that the use of the pivot to the first extension platform enables a user to move the first ramp 206 when the pin 210 is substantially vertical. Therefore, the user does not have to lift the first ramp 206, he only needs to swing it into position.

Having described the components of the trailer 100, its transition from a stored state to an extended state will now be described. In summary, when the trailer 100 is in the extended state, the support platforms 102, 104 are extended, the secondary platforms 140 are located over the spaces 136 and the ramps 204 are either stored or in the loading position. As described above, the extended position of the support platforms 102, 104 enables the width of the trailer 100 to be extended in order to accommodate wide loads, such as combines and sprayers. In the stored state of FIG. 1, the extension platforms 102, 104 are vertical and the secondary platforms 140 are located above the wheels 138.

The process for converting the trailer 100 from the stored state of FIGS. 1 and 6 to the extended state of FIG. 3 is completed in a few steps. In the first step, the support platforms 102, 104 are pivoted from the stored or first position to the second or extended position. An example of this first step is shown in FIGS. 2 and 7. As shown, the secondary platforms 140 are still in the first state because they are perpendicular to the extension platforms 102, 104.

The next step involves lowering the secondary platform 140 to fill the space 136, which yields the trailer 100 in the extended state as shown in FIG. 3. The ramps 204 may be lowered to enable a vehicle to be loaded onto the trailer 100.

Referring to FIG. 3, and as briefly described above, the secondary ramp 140 may have be elevated. The elevation is used to increase the height of the extension platforms 102, 104 in the proximity of the wheels 138. Thus, a combine or other device is raised over wheels 138 as it is loaded onto the trailer 100 and does not contact the wheels 138 during loading or transport. After the vehicle is loaded, the ramps 204 may be stored as shown in FIGS. 2 and 7. Latches or other securing mechanisms may secure the ramps 204 in this position.

The trailer 100 may be readily narrowed by reversing the steps described above. For example, the ramps 204 may be lowered to enable the vehicle to be removed. The ramps 204 may then be returned to the state shown in FIGS. 2 and 7. The secondary platforms 140 may be moved from their second state of FIG. 3 to their first state of FIGS. 2 and 7. The extension platforms 102, 104 may then be moved to the stored or first position as shown in FIGS. 1 and 6. Latches or securing mechanisms 196 may be engaged to secure the extension platforms 102, 104 in the first or stored position. As the extension platforms 102, 104 are moved to the stored position, the ramps 204 engage the securing mechanisms 212 in order to be secured. As described above, the process of moving the extension platforms 102, 104 and the secondary platforms 140 may be accomplished by the use of hydraulic devices.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A trailer comprising:
    a left side and a right side;
    an extension platform having a first side and a second side, the first side of the extension platform being pivotally connected to at least a portion of a side of the trailer, the extension platform being movable by way of the pivotal connection between a first position and a second position, wherein the extension platform is extended from a side of the trailer when it is in the second position, and wherein the first position of the extension platform is substantially perpendicular to the second position; and
    a secondary platform connected to the second side of the extension platform, the secondary platform being movable between a first position substantially perpendicular to the extension platform when the extension platform is in the first position and a second position substantially parallel to the extension platform when the extension platform is in the second position.

2. The trailer of claim 1, wherein the extension platform is pivotally attached to the secondary platform.

3. The trailer of claim 1, wherein said extension platform further comprises a block located proximate the first side, and wherein a block is located on the trailer proximate the first side of the extension platform, and wherein the block on the extension platform and the block on the trailer are located adjacent each other when the extension platform is in the second position.

4. The trailer of claim 3, wherein the block on the extension platform and the block on the trailer contact each other when the extension platform is in the second position.

5. The trailer of claim 1 and further comprising at least one wheel and wherein the extension platform has an opening and wherein the at least one wheel is locatable in the opening.

6. The trailer of claim 5, wherein when the extension platform is in the second position, a gap is located between the second side of the extension platform and the at least one wheel, and wherein the secondary platform is movable to the second position to at least partially fill the gap.

7. The trailer of claim 6, wherein when the extension platform is in the second position and the secondary platform is in the second position, a vehicle may be loaded onto the trailer by moving on the secondary platform to straddle the at least one wheel.

8. The trailer of claim 7, wherein the secondary platform has a height and wherein the height of the secondary platform raises the vehicle above the at least one wheel.

9. The trailer of claim 5, wherein when said extension platform is in said first position and said secondary platform is in said first position, said extension platform is located above said at least one wheel.

10. The trailer of claim 1, wherein said extension platform has a front end located proximate the front of the trailer and a rear end located proximate the rear of the trailer, and wherein a ramp is movably attached to the rear end of the extension platform.

11. The trailer of claim 1 and further comprising:
    a central structure extending at least partially the length of the trailer; and
    at least one beam extending from the central structure toward the extension platform, wherein the extension platform is movably attached to the at least one beam.

12. The trailer of claim 11, wherein the extension platform comprises at least one beam that is movably connected to the beam extending from the central structure.

13. The trailer of claim 12, and further comprising a first block located on the beam extending from the central beam and a second block on the beam of the extension platform, wherein the first block and the second block contact when the extension platform is in the second position.

14. The trailer of claim 11, wherein the beam extending from the central structure has an opening with a top surface located in the opening, wherein the beam of the extension platform is receivable in the opening, and wherein at least a portion of the beam of the extension platform contacts the top surface when the extension platform is in the second position.

15. The trailer of claim 1 and further comprising:
    a central structure extending at least partially the length of the trailer; and
    a plurality of beams extending from the central structure toward the extension platform;
    a plurality of beams affixed to the extension platform and aligned with beams extending from the central structure; and
    a pin extending through the beams extending from the central structure and through the beams of the extension platform;
    wherein the beams of the extension platform are movably attached to the beams extending from the central structure by way of the pin.

16. The trailer of claim 1 and further comprising a locking mechanism attached to the secondary platform, wherein the secondary platform is lockable in the first position by way of the locking mechanism.

17. A trailer comprising:
    a side;
    a front end and a rear end, wherein the side extends at least partially between the front end and the rear end;
    a central structure extending at least partially between the front end and the rear end;
    a plurality of central structure beams extending from the central structure toward the side;
    an extension platform having a first side and a second side with a plurality of beams extending between the first side and the second side, the beams being pivotally connected to the central structure beams, the extension platform being movable by way of the pivotal connection between a first position and a second position, wherein the extension platform is extended from a side of the trailer when it is in the second position, and wherein the first position of the extension platform is substantially perpendicular to the second position; and
    a secondary platform connected to the second side of the extension platform, the secondary platform being movable between a first position substantially perpendicular to the extension platform and a second position substantially parallel to the extension platform;
    at least one wheel on the side, and wherein the extension platform has an opening located proximate the at least one wheel, and wherein the opening is sized to receive the at least one wheel;

wherein the secondary platform at least partially covers the gap between the at least one wheel and the second side of the extension platform when the extension platform is in the second position.

18. The extension platform of claim 17, wherein a first block is located on a central structure beam and a second block is located on a beam of the extension platform, wherein the first block contacts the second block when the extension platform is in the second position.

19. A trailer comprising:

a left side and a right side;

an extension platform having a first side and a second side, the first side of the extension platform being pivotally connected to at least a portion of a side of the trailer, the extension platform being movable by way of the pivotal connection between a first position and a second position, wherein the extension platform is extended from a side of the trailer when it is in the second position, and wherein the first position of the extension platform is substantially perpendicular to the second position; and a secondary platform connected to the second side of the extension platform, the secondary platform being movable between a first position substantially perpendicular to the extension platform and a second position substantially parallel to the extension platform;

a central structure extending at least partially the length of the trailer; and at least one beam extending from the central structure toward the extension platform, wherein the extension platform is movably attached to the at least one beam;

wherein the beam extending from the central structure has an opening with a top surface located in the opening, wherein the beam of the extension platform is receivable in the opening, and wherein at least a portion of the beam of the extension platform contacts the top surface when the extension platform is in the second position.

* * * * *